United States Patent [19]

Alonso et al.

[11] Patent Number: 4,660,711

[45] Date of Patent: Apr. 28, 1987

[54] ARTICLE TRANSFERENCE SYSTEM AND APPARATUS

[75] Inventors: Antonio C. Alonso; Luis L. Alvarez-Icaza; Roberto R. Canales, all of Monterrey, Mexico

[73] Assignee: Vitro Tec Fideicomiso, Monterrey, Mexico

[21] Appl. No.: 631,523

[22] Filed: Jul. 18, 1984

Related U.S. Application Data

[63] Continuation of Ser. No. 305,683, Sep. 25, 1981, abandoned.

[30] Foreign Application Priority Data

Sep. 26, 1980 [MX] Mexico .................................. 184116

[51] Int. Cl.$^4$ ............................................. B65G 25/00
[52] U.S. Cl. ................................ 198/430; 198/468.1; 414/917
[58] Field of Search ............... 198/457, 430, 487, 740, 198/427, 429, 468.9, 468.1; 414/273, 917, 749; 901/14, 15, 19

[56] References Cited

U.S. PATENT DOCUMENTS

| | | | |
|---|---|---|---|
| 2,183,163 | 12/1939 | Howard | 198/429 X |
| 2,464,530 | 3/1949 | Reimers | 198/430 X |
| 2,596,404 | 5/1952 | Holbeck | 198/430 |
| 3,168,194 | 2/1965 | Calvin | 901/14 X |
| 3,184,031 | 5/1965 | Dunlap | 198/430 |
| 3,262,593 | 7/1966 | Hainer | 901/15 X |
| 3,703,968 | 11/1972 | Uhrich et al. | 414/917 X |
| 3,757,961 | 9/1973 | Jacobs | 198/740 X |
| 3,850,307 | 11/1974 | Motoda | 901/14 X |
| 3,853,213 | 12/1974 | Lehman et al. | 198/429 X |
| 3,968,888 | 7/1976 | Van Vliet | 414/273 |
| 3,995,756 | 12/1976 | Hjelm | 901/15 X |
| 4,003,464 | 1/1977 | Zappia | 198/430 |
| 4,290,517 | 9/1981 | Hafferkamp | 198/427 |
| 4,367,998 | 1/1983 | Causer | 901/15 X |

Primary Examiner—Joseph E. Valenza
Assistant Examiner—Jonathan D. Holmes
Attorney, Agent, or Firm—Solon B. Kemon

[57] ABSTRACT

An article transfer apparatus for loading rows of hot glass articles such as bottles, from a cross conveyor, through dead plates, to a linear conveyor of a lehr, utilizes a pusher bar mounted on a system of a horizontal parallelogram frame and two pairs of serially coupled vertically oriented parallelogram frames, articulated at their corners and drivingly interconnected in order to impart bilateral, advance and backward, upward and downward movements to said bar—maintaining always its vertical position and perpendicular orientation regarding the rows of bottles advancing on the cross conveyor while sweeping out said rows of bottles.

5 Claims, 11 Drawing Figures

ARTICLE TRANSFERENCE SYSTEM AND APPARATUS

This application is a continuation of application Ser. No. 305,683, filed Sept. 25, 1981, now abandoned.

BACKGROUND OF THE INVENTION

In a conventional I.S. type machine for the production of glass containers, such as bottles, jars etc, molten glass is fed in the form of gobs which are distributed by means of a distributor to the individual forming sections (generally eight). The containers formed in each of the individual forming sections of the machine are deposited while still hot first on the dead plate of the respective section and from there pushed up to a transfer conveyor called a "carriers" which moves the containers from all of the sections up to a "transfer" placed at the end of the carrier. The transfer separates the containers uniformly and changes the direction of their travel 90° placing them one by one equally spaced in a row on a cross conveyor. Once a complete row of containers is formed, a transfer device on mechanical pusher apparatus simultaneously transfers an entire row from the cross conveyor to the linear conveyor of a lehr. In general, pushers to transfer bottles from the cross conveyor to the lehr use a rod which when moving in the direction of advance of the lehr conveyor simultaneously moves a row of bottles from the cross conveyor to transition dead plates and finally to the linear conveyor of the lehr. The pusher cycle continues with a vertical movement of the rod to allow its return over a new row of bottles which will be introduced to the lehr in the next cycle. While in its retracted position, the rod descends before again beginning its advancing movement.

Such pushers generally comprise a support base, a drive system which comprises a motor working in synchronous operation with the machine and with the lehr and a pushing system comprising two tracks in which two arms holding the pusher rod are mounted for sliding movement and whose arms are moved by cams, connecting rods and cranks designed to impart the desired transfer path to the pusher rod.

In the bottle transfer process with the conventional pushers, a high loss of bottles occurs because the pusher knocks over a certain number during the pushing portion of its cycle. The percentage of bottles lost during the transfer process can be rather high because the bottles are still hot and in falling off the conveyors (knocking over adjacent ones in the process) are susceptible to breaking, deforming or inadequate tempering which means that they will have to be discarded. In order to minimize this problem, a series of advances have been developed both in the apparatus and in the transfer paths. In many pusher designs, during the advance period, a velocity component is imparted to the pusher rod in the direction of movement of the cross conveyor. This reduces the sliding relative movement between the rod and the bottles because the rod moves diagonally over the cross conveyor. Ideally this velocity component should be equal to the velocity of the cross conveyor but in general, such condition is not effected.

A common method to obtain a diagonal path of the rod, is by means of some additional cam and guides mechanism generally horizontal such as in the case of the mechanisms described in U.S. Pat. Nos. 1,437,455 of Mingle, 3,040,867 of Posten, 3,184,031 of Dunlap, 3,277,994 of Giusti, 3,853,213 of Lehman and 4,067,434 of Mumford.

Some pusher apparatuses such as those described in U.S. Pat. Nos. 1,436,455 of Mingle, 2,217,982 of Heil and 2,601,914 of Davies have mechanisms which produce an orbital path of the pusher rod in an horizontal plane. During the pushing of the bottles, as well as during the retraction period, the rod has a velocity component in the direction of advance of the cross conveyor. For example, in the system described in U.S. Pat. No. 2,601,914 of Davies, the pusher rod comprises the central member of a mechanism of four rods. Such mechanisms have the advantage of being simple and not requiring a vertical movement of the rod even when the range of adjustments in displacement is not too great.

To reduce the area occupied by the bottle transfer systems designs have been realized where the mechanism of the pusher is placed over the lehr as in U.S. Pat. No. 2,601,914. The disadvantages of such an arrangement are that the mechanism is difficult to reach by the operators and is exposed to high temperatures.

One other refinement incorporated in some pushers is a stabilizer strip for long and slim bottles. Said strip is positioned during the pushing period slightly beyond the upper part of the bottles to prevent them from inclining and falling forward. Two devices of this kind are described in U.S. Pat. Nos. 2,203,385 to Figel and 3,040,867 of Posten.

An aspect that has received little attention is the synchronization between the "transfer" and the pusher apparatus. It is frequently observed during the operation of a conventional pusher apparatus that the last bottle of a group that is being moved into the lehr is not pushed properly because it remains partially out of the path of the pushing rod. The result is that such bottles stay between the cross conveyor and the dead plates of the lehr obstructing the next group of bottles and sometimes causing them to break. In the system of U.S. Pat. No. 3,853,213 of Lehman, a solution is presented wherein the "transfer" is effected by a pusher device which functions in response to a signal from the I.S. machine. A counter sends a signal to the pusher to initiate its operation when a predetermined number of bottles have accumulated on the cross conveyor.

A concept that has been proposed for high production levels is that of the double pusher where two pusher rods operate alternately. U.S. Pat. No. 4,003,464 of Zappia describes a system that according to its inventor allows machine operation of up to 35 cycles per minute.

In the pusher of the catalog of the Shepee Motor and Engineering Co., Ltd., York, U.K. part of the pusher rod (in the side where the bottles arrive over the cross conveyor) rotates during the retraction period around the horizontal shaft aligned with the length of the lehr in order to avoid interfering with the bottles that are advancing over the cross conveyor. In the same pusher almost all of the delicate mechanical parts are protected by covers.

The pusher apparatus of the catalog of Hydro-Glassomat of Standard Hydraulik, GmbH, Shmarrie, German Federal Republic, represents an advanced technology where the displacements of the pusher rod are produced by hydraulic cylinders controlled by an electronic system allowing a diversity of adjustments. The beginning of the cycle from the retracted position responds to a signal of a sensor in the cross conveyor or of a remote synchronization system. The pusher rod starts its advance and after a predetermined time, the transverse movement is initiated. At the moment the rod reaches its extreme position into the lehr, the action of an adjustable timer is initiated to control the starting of the vertical movement of the rod. At the moment that the extreme vertical position is reached, the retraction movement is initiated and another timer is activated in order that after a predetermined time, the rod returns to the the initial vertical position. The velocities of the displacements in the three different directions can be adjusted independently by means of valves for the oil fluid control.

Instead of pushing the bottles from the cross conveyor to the lehr conveyor, some machines raise them from the cross conveyor and deposit them over the lehr conveyor. This can be done for individual bottles or for groups of bottles as in the apparatus of British Pat. No. 1,313,867 of Jaeger et al.

A device which apparently is in its intial development stage is that analyzed in the reference K. F. Hahn Oberkirchen, "Getrieanalize einer Bogens chubkurbel fur einen neuen kuehlofeneinschieber" Glastenchniber, Vol. 51, No. 3, 1978 pp. 48–54. This device uses a four rod mechanism which achieves a transfer path of the bottles over a circular arch of a little less than 90°. The direction and initial velocity are the same as those of the cross conveyor and the last section and velocity coincide with that of the lehr conveyor. It is not explained how more than a bottle can be transferred at a time, nor how the interference of the mechanism with the bottles that are advancing in the cross conveyor during the return period is avoided. This type of pusher apparatus with combined mechanisms of cam and connecting rod-crank more commonly used, has the virtue of being simple and of easy adjustment but on the other hand, it has certain disadvantages. There is no control to present the last bottle of a group to be transferred from being intercepted too near the end of the pusher rod causing the bottles to deviate from the desired path. The cam which produced the vertical movement requires good lubrication or else irregular movements could be induced that cause bottles to fall over. The velocity of the pusher rod is considerable at the moment of making contact with the bottles.

From the above analysis of the state of the prior art, pusher apparatus, it can be observed that practically all of the pushers to date try to improve the operation velocity and to impart a softer path by means of more or less elaborate mechanisms. Practically all the known pushers travel in a path controlled by means of special designed cams whose shape is dictated by the desired path, the shape or slimness of the bottles, the production velocity, etc. The problems caused by the use of such cams are well known. These are mainly, that due to continuous exposure to considerable stresses to move heavy mechanisms at relatively high velocities, the cam surfaces and shaft suffer fast and considerable wear making it necessary to stop the machine and the pusher apparatus to carry out adjustments or change the cams. Furthermore, the cams require continuous lubrication and cleaning, in order to function adequately. On the other hand, said pusher apparatus operated by cams, necessarily require a motor working in strict synchronism with the functions of the machine. When the motor is too fast or too slow there is no way to correct it unless the machine is stopped. Another important disadvantage of cam operated pusher apparatus is the lack of flexibility because no adjustments can be made during operation of the machine to change the transfer path to account for changes in the type or diameter of the articles. The machine must be stopped to change or adjust the cams and its other mechanisms in order to operate with different kinds of articles. Needed adjustments in the path due to deviations or misadjustments of the cams or mechanisms are not possible when the pusher is operating. Still another disadvantage of prior art apparatus is the lack of flexibility as to the possibility of modifying the velocity and acceleration of the mechanisms because these are driven by a motor whose synchronism is strictly regulated by the machine and velocity and acceleration are defined by the design of the cams. Taking into account the limitations of the paths and article transfer apparatus of the known prior art and considering as the main technological dimensions the number of thrown or tipped over articles, which depends on factors such as the form of the articles (the slimner the article the greater the loss is), the production velocity (the greater the number of cycles of the pusher per minute, the greater the loss is) and the synchronism among the components of the apparatus, initial cost, velocities and feeding ranges, range of articles that can be handled (shape, diameter), selectivity, distance between the articles and range of adjustments that can be made, maximum impact allowed, maximum acceleration permitted and width of the lehr, research was carried out to find an optimal path of an article transfer apparatus which could overcome all the limitations of the previous pusher apparatus.

Taking the number of bottles knocked over as one of the technological considerations of greater importance, mathematical models were formulated to obtain the maximum velocity of the pusher rod at the moment of its impact against the containers and the maximum acceleration during the pushing path, such that for values lower than maximum, it could be insured that the pusher does not topple the containers by impact or by accleration. The models first considered the containers as ideal cylindrical test tubes, friction was neglected and a perfectly elastic impact was assumed. These assumptions represented more unfavorable conditions than the real ones and therefore the specifications obtained with said models were considered conservative. As the next step, experimental information was obtained which allowed an improvement of the above-mentioned specifications. Thus, the center of mass and rotation radius of those containers which had been considered of importance, because of production or sales volume was obtained and the static and dynamic friction coefficient between the containers and a conveyor such as those used in production was determined at different temperatures both in the transverse and longitudinal directions of the conveyor. These coefficients were also obtained for a steel plate carrying out tests at different temperatures. Also determined were restitution coefficients for a hard strip of asbestos and for a soft cover of the same material used to cover the transfer rod to avoid thermal impact on the containers. New mathematical models were then formulated taking into account friction and the restitution coefficients thus establishing new permissible maximum values for velocity and acceleration of the pusher arm for each of the selected containers. From these values it was possible to determine curves of time against velocity and position of the transfer arm which defined the kinematics of the path and device of the present invention. All these investigations have as a result an article transfer system in which the transfer rod describes an optimal path with specific velocities and accelerations, which practically reduce to zero the number of knocked-over articles during their transfer to the lehr independently of the type of pusher apparatus that could be used for such purpose.

BRIEF SUMMARY OF THE INVENTION

In accordance with the present invention, an article transfer apparatus is moved by servo motors controlled electrically and or electronically to achieve the necessary tridimensional movements to transfer articles from the cross conveyor through deadplates to the linear conveyor of the lehr or other peripheral unit. The system is highly flexible as regards correction adjustments and can give as many paths as needed and can handle any size and configuration of articles by direct feeding to its system of the article data without the necessity of stopping the machine and/or the apparatus.

DETAILED DESCRIPTION OF THE DRAWINGS

Figure 1:
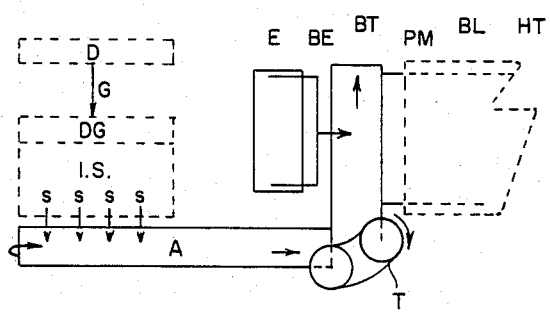
FIG. 1 is a schematic diagram of a system for the production and handling of glass containers.
Figure 2:
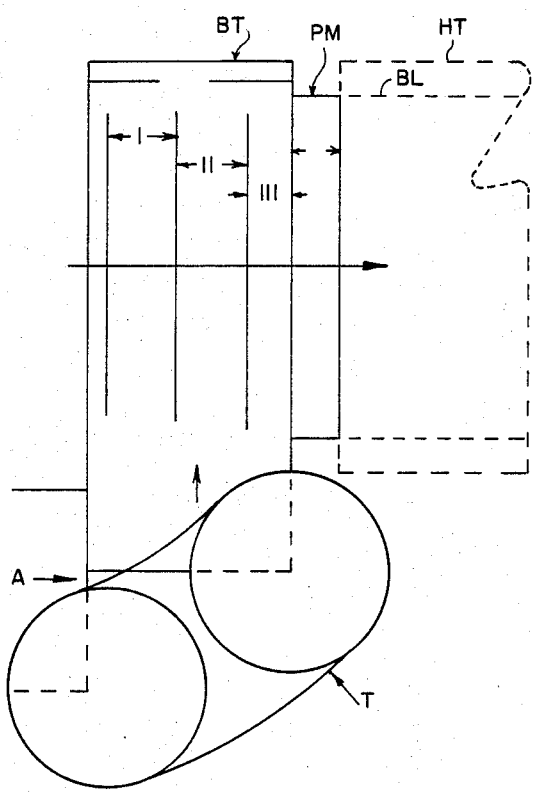
FIG. 2 is an enlarged diagram of portions of FIG. 1 showing the various zones which enter into the article path according to the present invention.
Figure 3:
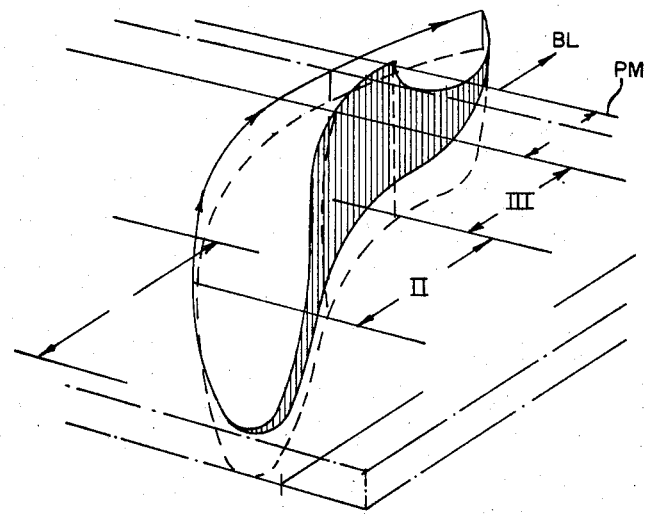
FIG. 3 is an isometric diagram approximately illustrating the article transfer of the present invention.
Figure 4:
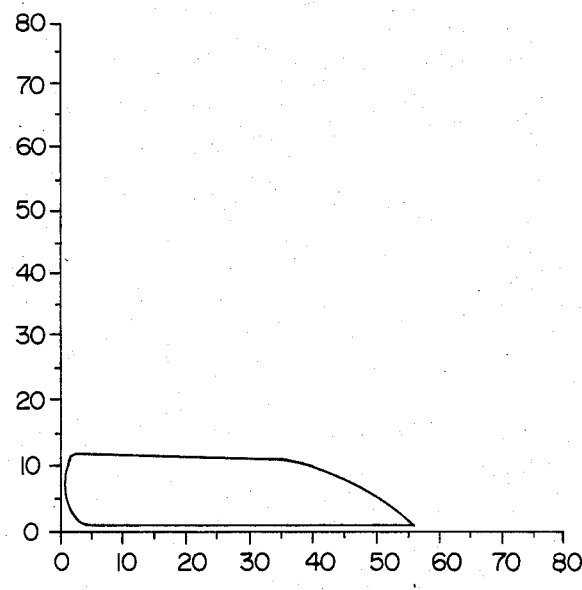
FIG. 4 is a graph of the displacement in the XY plane of the article transfer path.
Figure 5:
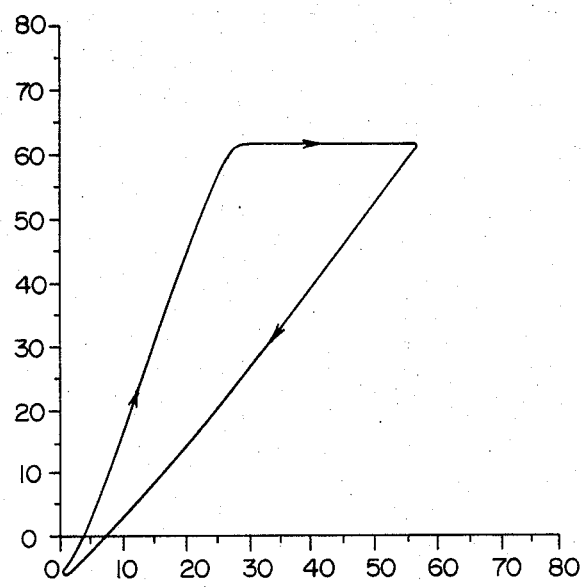
FIG. 5 is a graph of the displacement in the X-Z plane.
Figure 6:
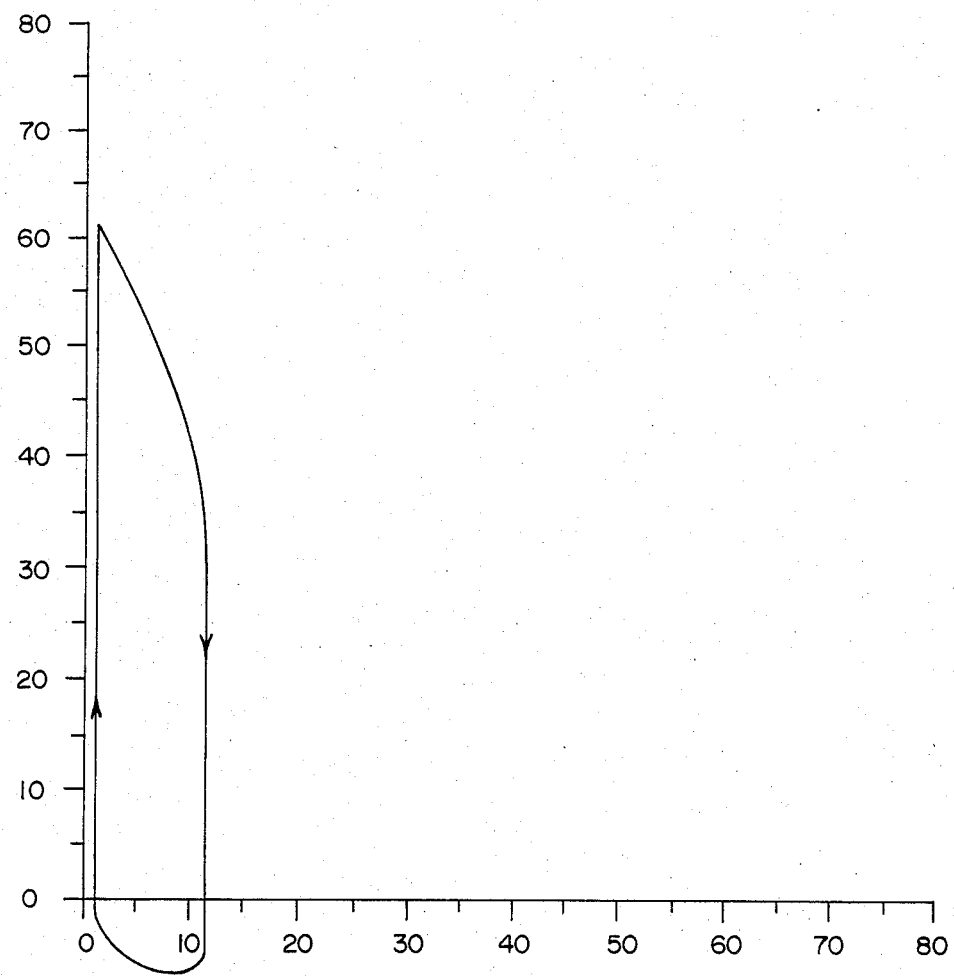
FIG. 6 is a graph which shows the displacement in the Y-Z plane.

With reference to FIG. 1, in the process of producing and manufacturing glass articles such as containers, molten glass is fed from a feeder D in the form of gobs G which are distributed by a distributor DG to the individual forming sections S of the I.S. machine. The containers formed by each of the forming sections S, still hot, are deposited first on the dead plate (not shown) of the respective section and from this they are pushed to a carrier conveyor A which moves the containers of all the sections up to a transfer T placed at the end thereof which regulates the flow of the containers separating them uniformly and changing the direction of movement by 90° and depositing them one by one on the cross conveyor BT in a uniformly spaced row. Once a complete row of articles has been formed, a pusher E simultaneously transfers by means of a pusher rod BE all the containers of the row of the cross conveyor BT through transition deadplates PM of the linear conveyor BL of a lehr HT.

The movement of the article transfer pusher as it moves the articles on the cross conveyor BT to the deadplates PM and then to the linear conveyor BL of the lehr HT will now be described with reference to FIGS. 2 to 6.

A. In a first zone I of possible contact with the articles on the cross conveyor BT, the pusher moves in a diagonal path at constant velocity which equals the velocity of the cross conveyor itself, the articles being engaged at a predetermined constant height above the conveyor surface.

B. A curved path across the rest of the cross conveyor BT is then given to the pusher first in a second intermediate zone II of the cross conveyor BT which extends between the end of zone I and the beginning of a third zone III which has a width equivalent to and approximately the diamter of the article before arriving at the deadplates PM. Maintaining the same velocity in the direction of the cross conveyor BT, and at the same height, but with a movement with piecewise constant positive and/or negative acceleration in the direction perpendicular to the cross conveyor BT, and then in the third zone III of the cross conveyor BT with a movement with piecewise constant positive and/or negative acceleration until stopping in the direction of the cross conveyor BT when arriving at the beginning of the deadplates PM always at the same height and maintaining a movement with piecewise positive and/or negative acceleration in a direction perpendicular to the cross conveyor BT.

C. Imparting a linear path in the direction of the linear conveyor BL from the beginning of the deadplates PM until a point just beyond the beginning of the linear conveyor BL again at the same height and with a movement with piecewise constant positive and/or negative acceleration only in the direction of the linear conveyor BL.

D. Describing a curved composite return path, with a movement with piecewise positive and/or negative accleration in the vertical direction and the direction of the cross conveyor BT and inverse in the direction of the linear conveyor BL, up to approximately the middle of zone II of the cross conveyor BT, until reaching a height greater than the articles advancing in the next row over the cross conveyor BT.

E. Describing a slightly curved return path with a movement with piecewise constant positive and/or negative acceleration in the direction of the cross conveyor BT and inverse of the linear conveyor BL when passing over the rest of the zone II up to approximately the middle zone I of the cross conveyor and at the maximum height, and F. Describing a curved return path and beginning of the next path with a movement with piecewise constant positive and/or negative acceleration in the three return directions, over the rest of zone I and the initial edge of the cross conveyor BT until reaching the normal height of pushing of the next row of articles that has advanced over the cross conveyor BT to start the next transfer path.

Figure 7:
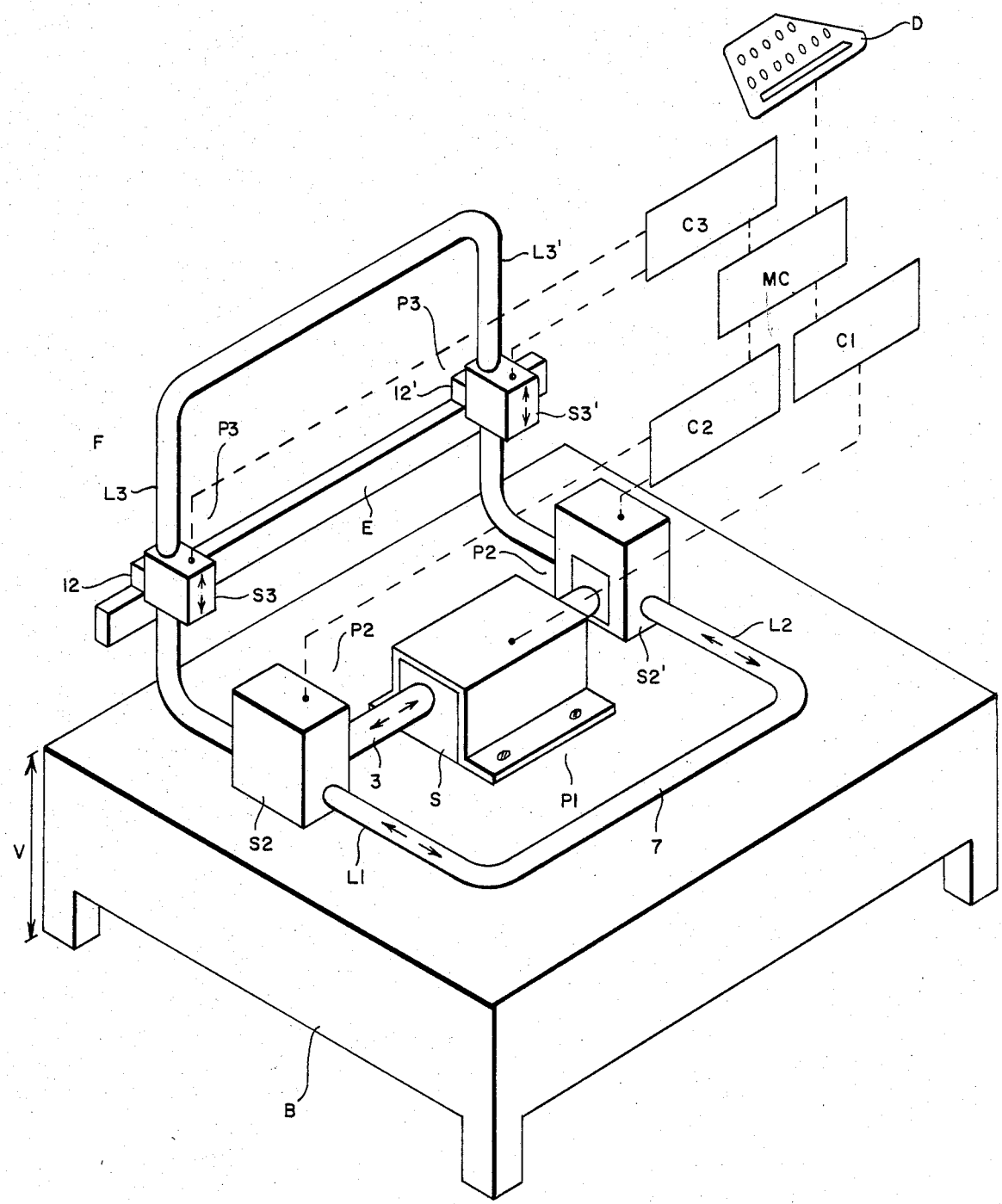
FIG. 7 is a perspective view of a first embodiment of the article transfer apparatus.
Figure 7A:
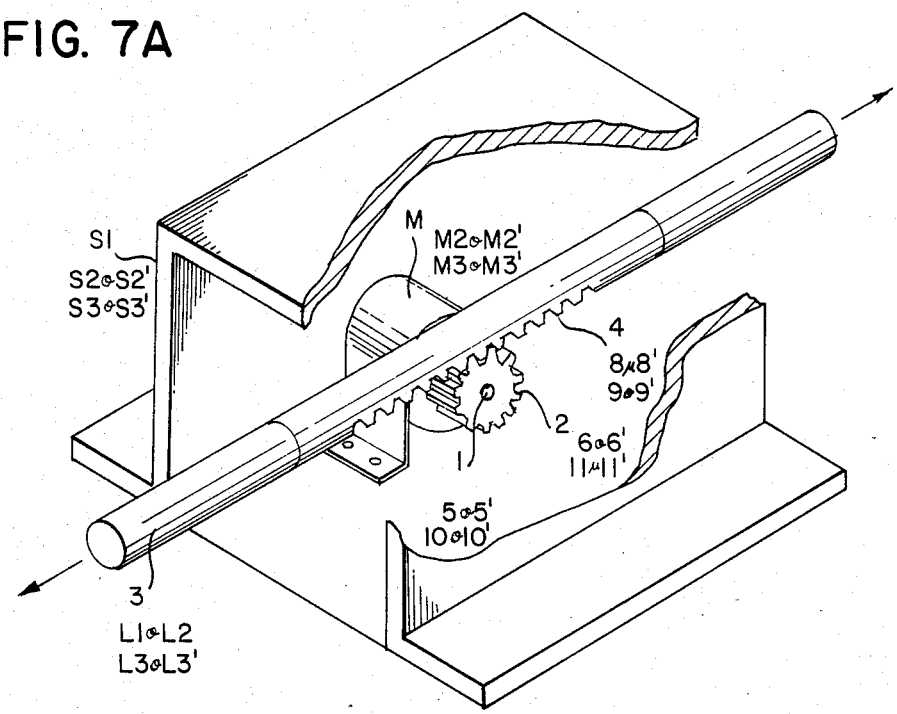
FIGS. 7A and 7B are perspective views of two forms of coupling of one of the components of the embodiment illustrated in FIG. 7.
Figure 7B:
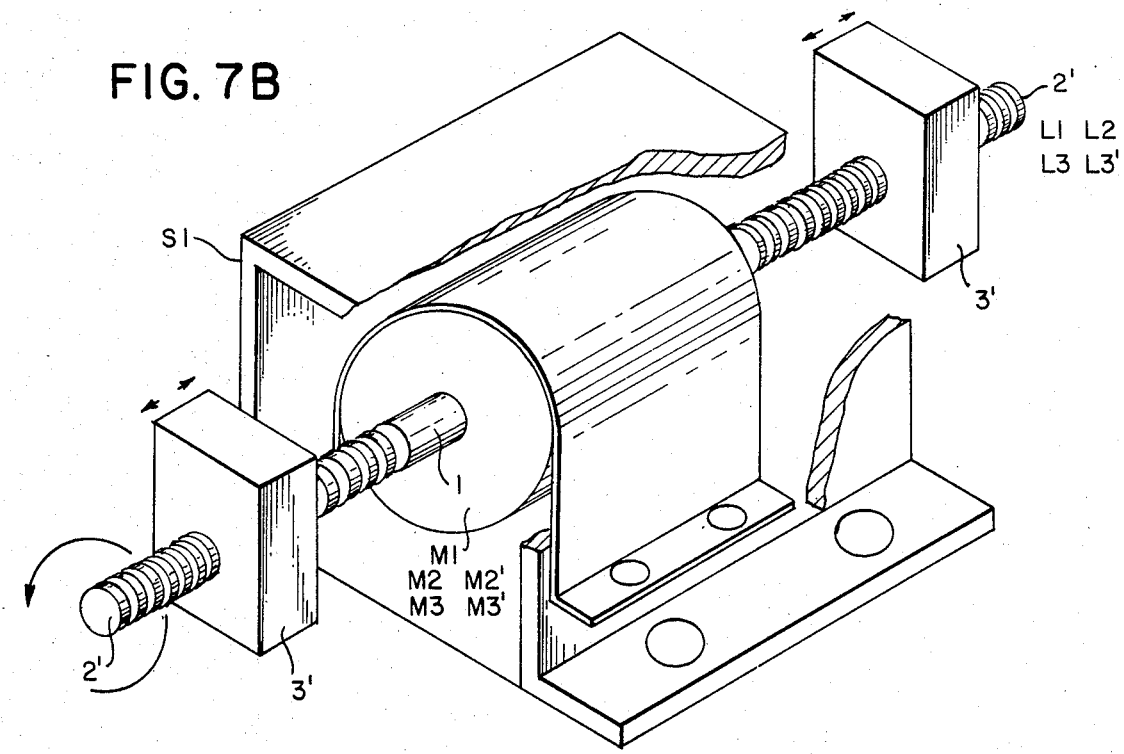

A first embodiment of transfer apparatus of the present invention is illustrated in FIGS. 7, & 7A and 7B. The latter Figures illustrate alternative embodiments of drive mechanisms which can be housed in S1, S2, S2', S3 or S3' of FIG. 7. A base or support frame B of adjustable height supports a bilateral movement positioner P1. P1 may include a stepping motor M1 housed in a support case S1 fastened to the base of frame B. As shown in FIG. 7A, the motor M1 has a pinion 2 coupled to its shaft 1 which mates with a rack 3 on a rod supported for sliding movement with respect to case S1. The central portion 4 of rack 3 is engaged by pinion 2 to transform the rotary movement of motor M1 to a linear bilateral movement of the rod 3. An alternative illustrated in FIGS. 7B includes two worm screws 2' directly coupled to the ends of the motor shaft 1 on which are threaded a pair of nuts 3'. The nuts are firmly coupled either to support case S1 or to support cases S2, S2' so as to advance and return movement positioner P2. P2 may include a pair of stepping motors M2, M2' housed in respective support cases S2, S2' each of which is coupled at one end respectively of the rods 3 or to the nuts 3' of the positioner P1. Each of the motors M2 and M2' may include pinions as described with reference to P1. A horizontal frame 7 having if desired, a counter weight in its rear arm and having lateral arms L1, L2 is supported and passes through the respective cases S2, S2' perpendicularly to the rod 3. The frontal parts F are bent vertically upwards and extend through housings S3 and S3'. An upward and downward movement positioner P3 includes two stepping motors M3, M3' placed in respective support cases S3, S3' each of which has a frontal fastener 12, 12' and is coupled to each of the arms L3, L3' of frame 7. The article engaging pushing means is a pusher rod E connected to the fasteners 12, 12' of the cases S3, S3' of positioner P3.

Electronic controls C1, C2, C3 each includes its respective pulse amplifier and is connected to motors M1, M2, M2', M3 and M3' of positioners P1, P2 and P3 respectively in order to control the respective motors. To sequence the electronic control means, a microcomputer MC is provided having a memory to store data of the paths, velocities and accelerations which it is desired to impart to the pusher rod E. An input data feeding device such as a key board D or other switching system, push buttons, thumbwheel or data reading digital system functions to synchronize and/or feed correction data to the control apparatus. Furthermore, the electronic control means, the pulse amplifiers and the sequencer systems could be the same for all embodiments of the transfer apparatus and therefore, will not be described in the following description of a different embodiment of the transfer mechanism.

Figure 8:
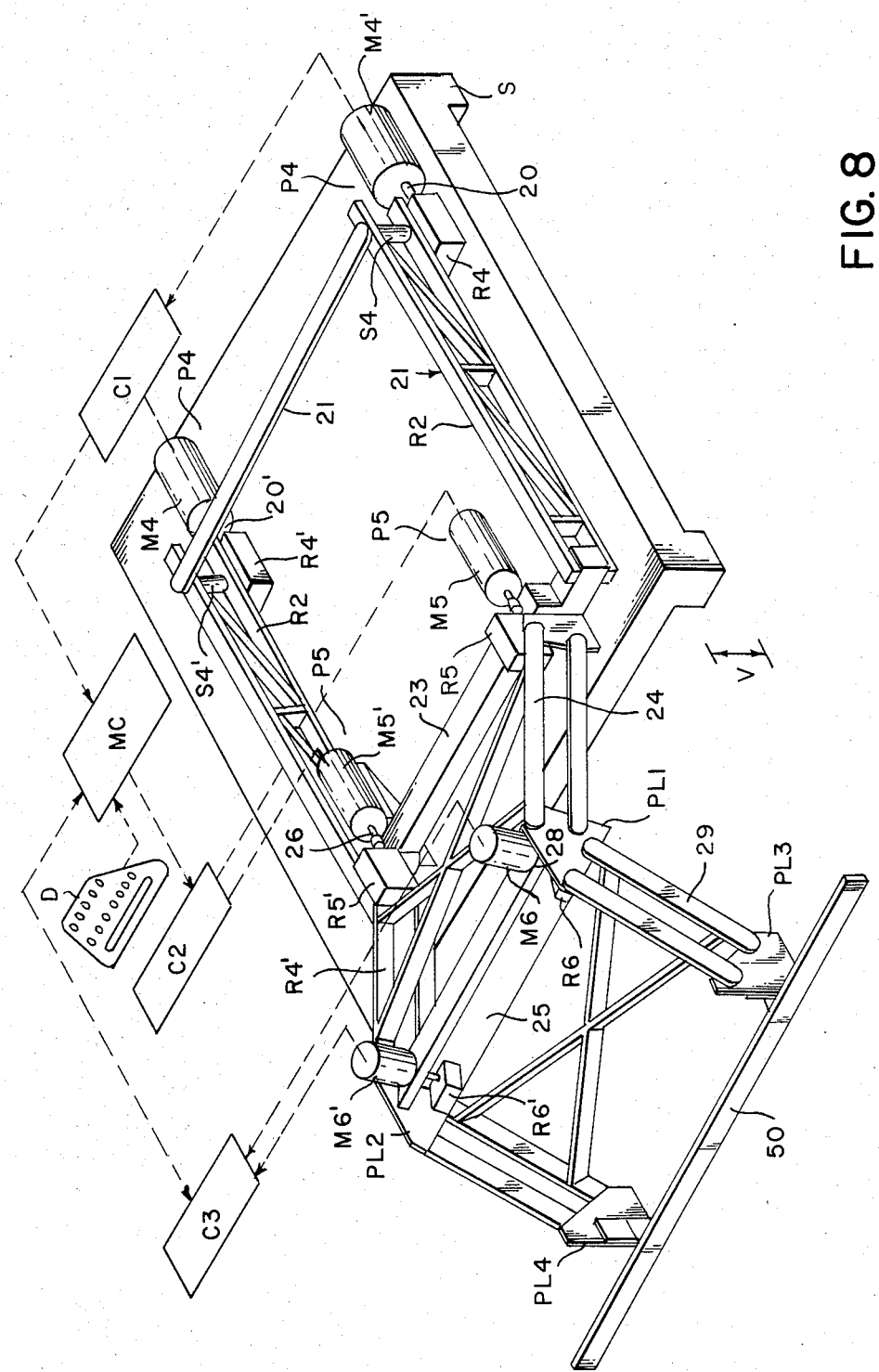
FIG. 8 is a perspective view of a second embodiment of an article transfer apparatus of the present invention.

Referring now to FIG. 8 for a description of a second embodiment of the article transfer apparatus, a base or support frame B of adjustable height supports the mechanical linkage for moving the pusher member in its desired path. A first bilateral rotative movement positioner P4 has two stepping motors M4, M4' mounted on the frame B. Each motor has a fastener S4, S4' coupled to its shaft 20, 20' through respective reducer units R4, R4'. A horizontal frame 21 articulated at its corners and including if desired a counterweight in its rear arm 23' has lateral arms 22, 22' fastened and passing through the respective fasteners S4, S4' in order to impart the bilateral annular movement thereto. A second bidirectional rotary movement positioner P5 also has two stepping motors M5, M5' fastened to the frontal arm 23 of frame 21 and a pair of double arms 24, 24' rigidly coupled through reducer units R5, R5' to the shafts 26, 26' to impart rotary movement to a pair of double arms 24, 24'. A third bidirectional rotary movement positioner P6 includes a pair of stepping motors M6, M6' fastened to a frontal arm 25 coupled through a pair of articulated plates PL1, PL2 to the double arms 24, 24'. The shafts 28, 28' of motors M6 M6' are rigidly coupled through a reducer units R6, R6' to each of a pair of double lateral arms 29, 29' and a pusher rod 30 coupled through the articulated plates PL3, PL4 to the double arms 29, 29'. The system formed by the double arms 24, 24' and 29, 29' and the plates PL1 and PL2, PL3 and PL4 have as a main goal to maintain verticality of the rod while allowing wide retractions of the same.

Figure 9:
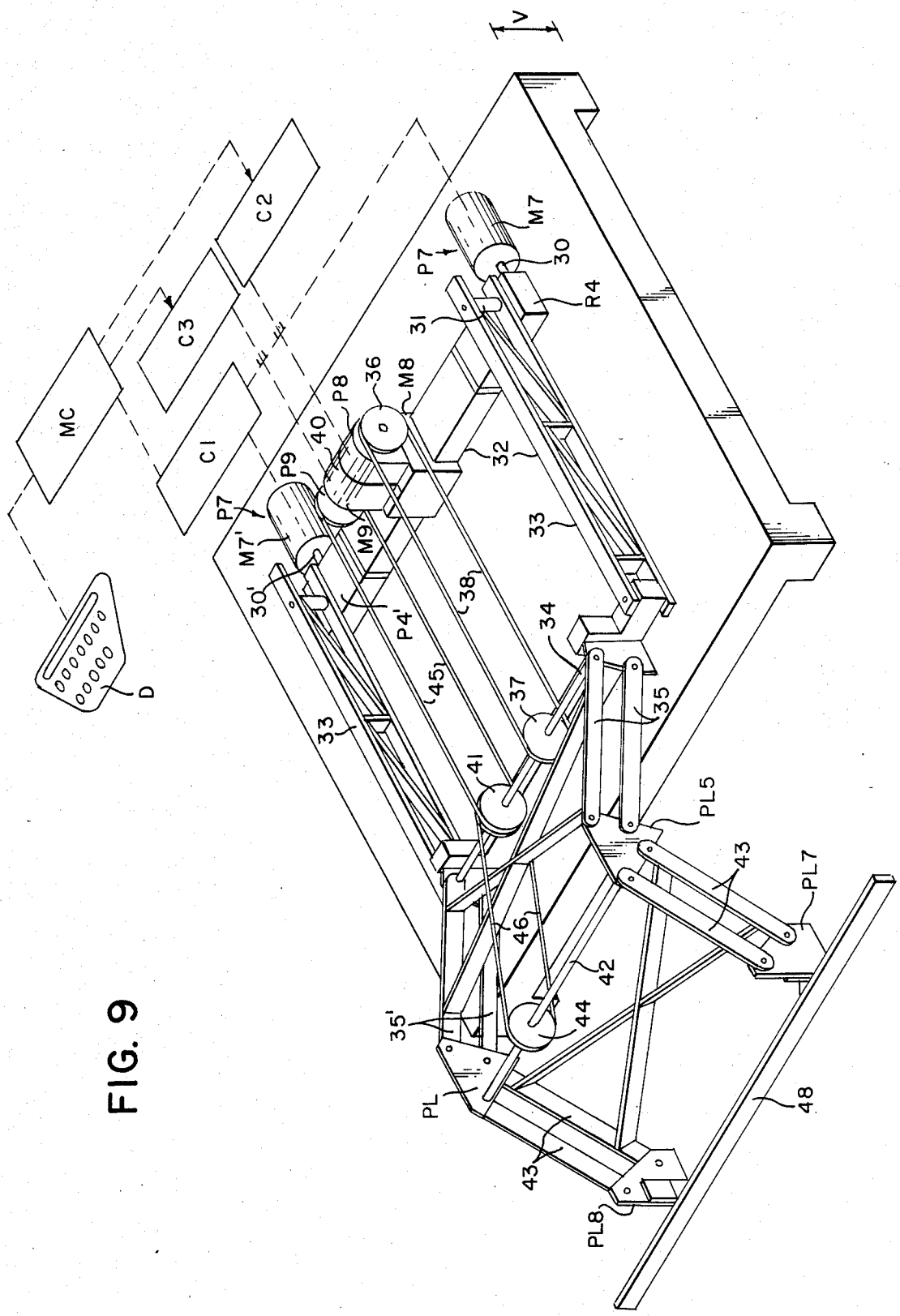
FIG. 9 is a perspective view of a third embodiment of an article transfer apparatus of the present invention.

Referring finally to FIG. 9 for a description of a third embodiment of the article transfer apparatus, a base or support frame B of adjustable height is provided as before. A first bilateral rotary movement positioner P7 includes two stepping motors M7, M7' mounted on the support frame. Motor shafts 30, 30' each have a fastener 31, 31' coupled through reducer units R4, R4'. A horizontal frame 32 articulated at its corners has lateral arms 33, 33' connected to fasteners 31, 31'. A second bidirectional rotary movement positioner P8 has a stepping motor M8 mounted on the frame B and a pair of double arms 35, 35' articulated to the end of the lateral arms 33, 33' of frame 32. A first pulley or sprocket 36 is coupled to the shaft 34' of the motor M8 and a second pulley or sprocket 37 coupled to shaft E8 supported by the frontal arm 34 of frame 32. A first cable or chain 38 links the first and second pulleys or sprockets 36 and 37. A third bilateral rotary movement positioner includes a stepping motor M9 mounted on the support frame B and having a third pulley or sprocket 40 coupled to its shaft 39. A fourth double pulley or sprocket 41 is mounted on the shaft E8 supported by the frontal arm 34 of frame 32. A frontal shaft 42 and a pair of double lateral arms 43, 43' link through articulated plates PL5 and PL6 the pair of double lateral arms 35, 35' of the positioner P8. A fifth pulley or sprocket 44 is coupled to the frontal shaft 42. A second cable or chain 45 links the third and fourth pulleys or sprockets 40 and 41 and a third cable or chain 46 links the fourth and fifth pulleys or sprockets 41 and 44. The article contact pusher rod 48 is coupled through articulated plates PL7 and PL8 to a pair of double lateral arms 43, 43', the system formed by the arms 35, 35' and 43, 43' and the plates PL5 and PL6, PL7 and PL8 are used to keep rod 48 vertical while allowing wide retraction movements.

In the descriptions of all of the foregoing embodiments, reference has been made to positioners which are constituted by stepping motors. However, it should be understood that it is also possible to use fast response motors, servo motors or fluid motors that could be controlled by means of pulses or signals from respective controllers. It should also be understood that embodiments of the transfer apparatus described herein are for illustrative purposes only and applicant therefore claims the benefit of a full range of equivalents within the scope of the appended claims.

We claim:

1. Apparatus for transferring rows of articles from a cross conveyor, across dead plates, to a linear conveyor of a peripheral unit such as a lehr, comprising:

a base of adjustable height adjacent to the cross conveyor;

a first parallelogram frame having first and second ends articulated at its corners and pivotally supported by the two corners of its first end on said base for bilateral movement of its second end parallel to said base;

first drive means mounted on said base and connected to said first end of said frame for imparting bilateral movement to the second end of said frame;

second and third parallelogram frames parallel to each other, articulated at their corners and having first and second ends, coupled at their first ends to the second end of said first frame for bilateral movement of their second ends vertically with respect to said base;

second drive means coupled to the first end of at least one of said second and third frames for imparting vertical bilateral movement of the second end of said frames;

fourth and fifth parallelogram frames parallel to each other, articulated at their corners, having first and second ends and coupled at their first ends to the second ends of said third and fourth frames for bilateral movement of their second ends vertically with respect to said base;

third drive means coupled to the first end of at least one of said fourth and fifth frames for imparting bilateral movement of the second ends thereof vertically with respect to said base;

an article pusher bar coupled to the second end of said fourth and fifth frames; and control means controlling said first, second and third drive means in order to provide the desired transfer path of the pusher bar while maintaining a desired vertical orientation of said pusher bar with respect to said base.

2. The apparatus as claimed in claim 1, wherein said first, second and third drive means each comprise a motor having linkage means coupled to its shaft and to the corresponding parallelogram frame for imparting their corresponding movements.

3. The apparatus as claimed in claim 2, wherein said linkage means are selected from the group consisting of rack and pinion, velocity reduction gears and sprocket and chain types.

4. The apparatus as claimed in claim 2, wherein said motors are stepping motors.

5. The apparatus as claimed in claim 1, wherein said control means comprises a microprocessor having means to introduce operating data therein.

* * * * *